United States Patent [19]

Kato

[11] Patent Number: 5,320,585

[45] Date of Patent: Jun. 14, 1994

[54] ENDLESS TRACK BELT ASSEMBLY

[75] Inventor: Yuusaku Kato, Fukuyama, Japan

[73] Assignees: Fukuyama Gomu Kogyo Kabushiki Kaisha; Kabushiki Kaisha Komatsu Seisakusho, both of Japan

[21] Appl. No.: 432,579

[22] Filed: Nov. 6, 1989

[51] Int. Cl.$^5$ ............................................. B62D 55/24
[52] U.S. Cl. .................................. 474/241; 305/35 R; 305/35 EB; 474/248
[58] Field of Search ............... 474/240, 241, 247, 248, 474/249, 260; 305/35 R, 35 EB, 38, 57, 60

[56] References Cited

U.S. PATENT DOCUMENTS

| | | | |
|---|---|---|---|
| 3,016,756 | 1/1962 | Jäckel | 474/248 |
| 4,678,244 | 7/1987 | Furuta et al. | 305/57 |
| 5,131,728 | 8/1982 | Katoh et al. | |

FOREIGN PATENT DOCUMENTS

| | | | |
|---|---|---|---|
| 55102683 | 1/1954 | Japan | . |
| 79764 | 6/1980 | Japan | 305/35 EB |
| 106378 | 6/1984 | Japan | 305/35 EB |
| 61129682 | 8/1986 | Japan | . |

*Primary Examiner*—William P. Neuder
*Attorney, Agent, or Firm*—Ronald P. Kananen

[57] ABSTRACT

A rubber endless track belt assembly for use in a crawler type track mechanism, which has a rubber endless track belt and a plurality of metal cores embedded at an equal spaced distance to one another in the belt along the longitudinal direction thereof. Each of the metal cores is provided with a pair of intermediate guide lugs spaced apart from each other and projecting outwardly on the inner peripheral side of the belt, a pair of wing portions each projecting horizontally in the transverse direction of the belt and embedded therein, and a pair of flat surface zones to which bogie wheels are thrustedly and rotatingly contacted, each of which zones being formed between the guide lug and the wing portion so as to extend in the longitudinal direction of the belt over the width of the wing portion and to be exposed on the inner peripheral side of the belt.

9 Claims, 6 Drawing Sheets

ENDLESS TRACK BELT ASSEMBLY

BACKGROUND OF THE INVENTION

1. Field of the Invention

This invention relates to an endless track belt assembly for use in a crawler type track mechanism, more particularly to an endless track belt assembly having a rubber endless track belt and a plurality of metal cores of which their respective lower parts are embedded at an equal spaced distance to one another in the rubber endless track belt along the longitudinal direction of the belt.

2. Description of the Prior Art

Heretofore, as a crawler type track mechanism, in construction machines, metallic endless track belt assemblies have been exclusively used. On the other hand, rubber endless track belt assemblies have been used in cultivation machines.

In the metallic endless track belt assembly 1, a plurality of center-flanged bogie wheels 2 or side-flanges bogie wheels 3 used exclusively for the metallic endless track belt assembly 1 have been associated therewith as shown in FIGS. 1A and 1B. On the other hand, in the rubber endless track belt assembly 1' in which a plurality of metal cores 6 are embedded in a rubber endless track belt 4 except for their respective guide lugs 7, a plurality of center-flanged bogie wheels 2 or outside-contacted bogie wheels 5 used exclusively for the rubber endless track belt assembly 1' have been associated therewith as shown in FIGS. 2A and 2B.

In FIGS. 2A and 2B, reference numeral 8 represents a plurality of steel cords embedded in the rubber endless track belt 4 and extending in the longitudinal direction of the belt 4 to reinforce the same.

In recent years, however, it has appeared that the rubber endless track belt assembly has been often used in construction machines also. In case the side-flanged bogie wheels are associated with the rubber endless track belt assembly, it tends to cause a bad condition called a "pitting phenomenon (water insect phenomenon)" on the contact surface of the rubber endless track belt, because outer peripheral surfaces of side flanges of each of the side-flanged bogie wheels are directly thrust-contacted to the contact surface. Therefore, the rubber endless track belt assembly cannot be used for a long time.

On the other hand, in case the center-flanged bogie wheels are associated with the rubber endless track belt assembly, it does not tend to cause the above-described problem, but the following inconveniences are caused.

Namely, since the rubber endless track belt assembly 1' is made to contact at respective top surfaces m, m of the guide lugs 7, 7 of the metal core 6 with roll-contact surface parts of the center-flanged bogie wheel 2 as shown in FIG. 2A, the distance h between the top surfaces m, m of the guide lugs 7, 7 and the steel cords 8 becomes large, and further it is necessary to enlarge the distance g (shown in FIG. 3) between respective guide lugs of two metal cores adjacent to each other embedded in the rubber endless track belt 4.

As a result, the rubber endless track belt assembly causes fluctuation vibrations at non-contacted portions thereof to the bogie wheels and so called as an "inward bending phenomenon" thereat also when the rubber endless track belt assembly is run on a projection such as, for example, a stone, etc. In case of the inward bending phenomenon, thus bent, non-contacted portion between two metal cores adjacent to each other is opened so that one of the center-flanged bogie wheels falls in that portion. As a result, both the guide lugs of such two metal cores adjacent to each other are forcibly kicked off by the "falled-in" bogie wheel when it gets off from the opened portion of the rubber endless track belt assembly, so that the metal cores are peeled off from the rubber endless track belt thereby deteriorating the durability of the rubber endless track belt assembly.

In order to prevent the aforementioned inconveniences from the rubber endless track belt assembly, it is thought to make all of the guide lugs in T-shape and to elongate the longitudinal length f of the top surface m of each guide lug as shown in FIG. 3. In such a structure of the guide lug, however, the distance g between respective guide lugs of two metal cores adjacent to each other is shortened, so that around the periphery of a drive or idler sprocket wheel respective of both edges of the guide lugs adjacent to one another in the longitudinal direction of the belt assembly cause a collision phenomenon. Therefore, the length f of the top surface m of each guide lug can not be enlarged more than a predetermined limited length, so that a reduction of vibrations and an effective prevention of the inward bending phenomenon themselves have their limitations.

In the case where case the outside-contacted bogie wheels are associated with the rubber endless track belt assembly, the aforementioned inconveniences of using the center-flanged bogie wheels do not occur because the roll-contact surface parts of each of the outside-contacted bogie wheels are directly contacted to the inner peripheral surface of the rubber endless track belt. However, the outside-contacted bogie wheels can not be associated with the metallic endless track belt assembly and tend to cause the above-described pitting phenomenon on the contact surface of the rubber endless track belt thereby deteriorating the durability of the rubber endless track belt assembly.

SUMMARY OF THE INVENTION

The present invention has been made in view of the above-mentioned circumstances in the prior art and its object is to provide an endless track belt assembly which can be associated with not only bogie wheels useful to a rubber endless track belt assembly such as, for example, center-flanged bogie wheels, outside-contacted bogie wheels, etc. but also with side-flanged bogie wheels used exclusively for a metallic endless track belt assembly in the prior art.

Another object of the present invention is to provide an endless track belt assembly which can prevent the cause of both the "pitting phenomenon" and the "inward bending phenomenon" thereof.

In order to achieve the foregoing objects, according to a first aspect of the present invention, there is provided an endless track belt assembly which comprises a rubber endless track belt trained around a drive sprocket wheel assembly and an idler sprocket wheel assembly of a crawler type track vehicle and a plurality of metal cores of which their respective lower parts are embedded at an equal spaced distance to one another in the rubber endless track belt along the longitudinal direction thereof, each of the metal cores being integrally provided with a pair of intermediate guide lugs spaced apart from each other and projecting outwardly on the inner peripheral side of the rubber endless track belt so as to be exposed from the belt, a pair of wing portions projecting horizontally on the transverse sides, respectively, of the belt and embedded therein, and a pair of flat surface zones each having a predetermined width to which bogie wheels are rotatingly contacted, each of which being formed between the guide lug and the wing portion so as to extend in the longitudinal direction of the belt longer than the width of the wing portion and to be exposed on the inner peripheral side thereof.

According to a second aspect of the present invention, there is a provided an endless track belt assembly as set forth in the first aspect in which each of the pair of flat surface zones is formed as a shoulder stepped portion of the guide lug raised over the wing portion so as to make the outer surface thereof the same level as the inner peripheral surface of the rubber endless track belt.

According to a third aspect of the present invention, there is provided an endless track belt assembly as set forth in the first aspect in which the rubber endless track belt has a plurality of recessed grooves each formed in such a portion thereof as positioned between respective shoulder stepped portions of the metal cores adjacent to each other and extending in the transverse direction of the rubber endless track belt.

Thus, the present invention having the above-described aspects takes the following effects or advantages.

The rubber endless track belt assembly of the present invention can be associated with not only bogie wheels for the rubber endless track belt assembly but also those for a metallic endless track belt assembly.

Since the distance between the steel cords and the flat surface zones of each metal core to which bogie wheels allow to effect rolling contact can be shortened in case the side-flanged bogie wheels or the outside-contacted bogie wheels are associated with the rubber endless track belt assembly, as shown in FIGS. 7 to 9, and further the distance between the adjacent metal cores can be narrowed without causing the "collision phenomenon" therebetween, the "inward bending phenomenon" of the belt can be prevented so as to protect the fall-in of the bogie wheel between the adjacent metal cores and to reduce fluctuation vibrations of the belt assembly thereby effecting a stable running condition in construction vehicles, and moreover the winding pressure rate between the rubber endless track belt assembly and the drive sprocket wheel or the idler sprocket wheel can be reduced so as to perform an effective transmission of driving force from the drive sprocket wheel to the rubber endless track belt assembly. At that time, such an operational function as relieving compressive strain generated in the rubber endless track belt and concentrated at the inner peripheral surface of the belt is obtained by the provision of recessed grooves each formed in such a portion of the belt as positioned between respective shoulder stepped portions of the metal cores adjacent to each other.

Further, since the bogie wheels are allowed to contact the rubber endless track belt assembly through the pairs of flat surface zones having a predetermined width of the metal cores, the rubber endless track belt can be prevented from causing the "pitting phenomenon" on the surface thereof, thereby enhancing the durability of the rubber endless track belt assembly.

Still further, since the side-flanged bogie wheels and the outside-contacted bogie wheels can be associated with the rubber endless track belt assembly, it is unnecessary to provide each of the bogie wheels with a come-off protection board for protecting the disengagement of the belt from the bogie wheels.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE PREFERRED EMBODIMENTS

Some preferred embodiments of the present invention will be hereinbelow described with reference to FIGS. 4A to 10.

Figure 6A:
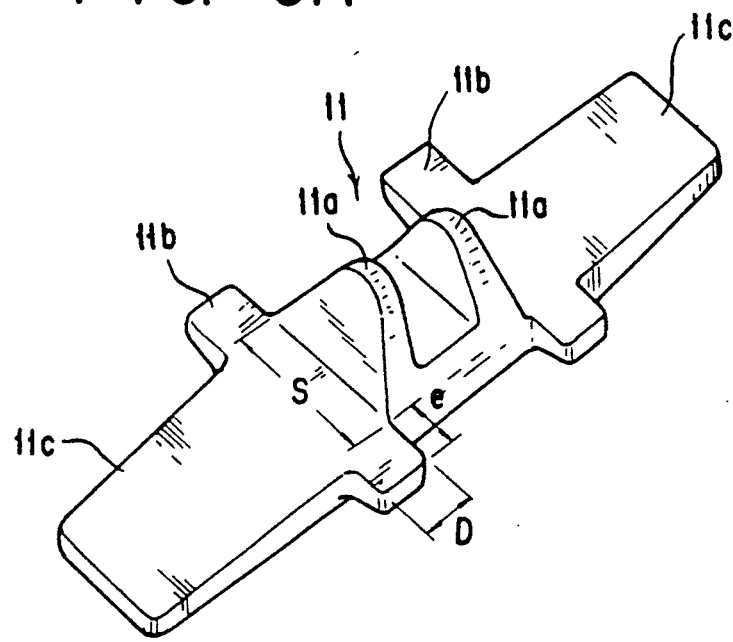
FIGS. 6A and 6B are schematic perspective views of metal cores used in the rubber endless track belt assemblies shown in FIGS. 4A and 4B, respectively.
Figure 6B:
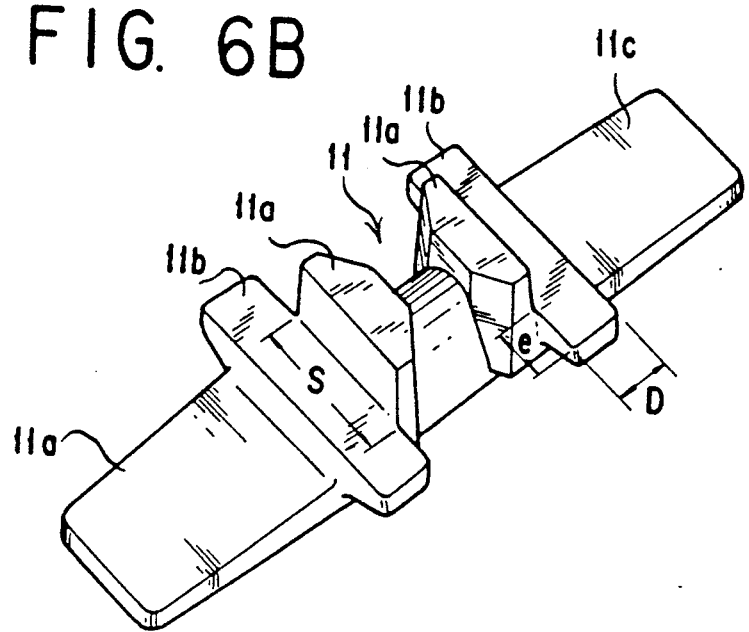

As shown in FIGS. 6A and 6B, each of a plurality of metal cores 11 used in a rubber endless track belt assembly of the present invention is integrally provided with a pair of flat surface zones 11b, 11b having a predetermined width "D", each of which zone being formed between a guide lug 11a projecting upwardly in the drawings and a wing portion 11c so as to extend in the longitudinal direction of the rubber endless track belt assembly over the width "S" of the wing portion 11c.

Figure 10:
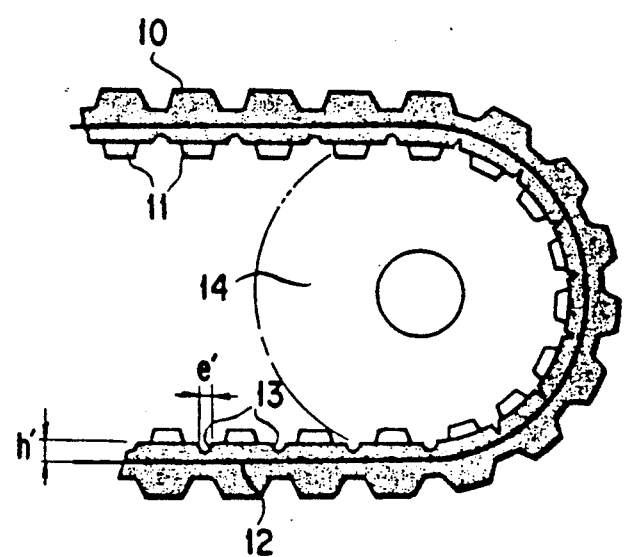
FIG. 10 is a fragmentary schematic sectional views showing a crawler type track mechanism in which the rubber endless track belt assembly of the present invention is traced around a drive or idler sprocket wheel.

The flat surface zones 11b, 11b shown in FIG. 6A are formed such that their respective upper surfaces directed in the inner peripheral side of the rubber endless track assembly as shown in FIG. 10 are smoothly connected with the upper surface of the wing portions 11c, On the other hand, each of the flat surface zone 11b shown in FIG. 6B are formed on a shoulder stepped portion of the guide lug 11a so as to rise over the wing portion 11c.

Figure 4A:
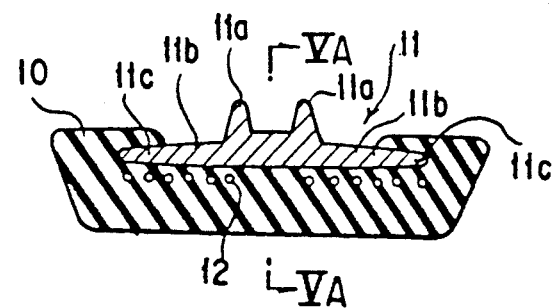
FIGS. 4A and 4B are schematic sectional views of rubber endless track belt assemblies as first and second embodiments of the present invention, respectively.
Figure 4B:
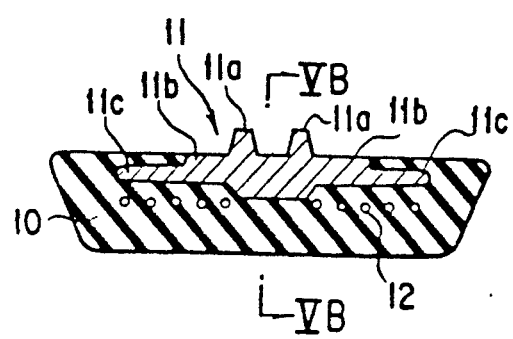
Figure 5A:
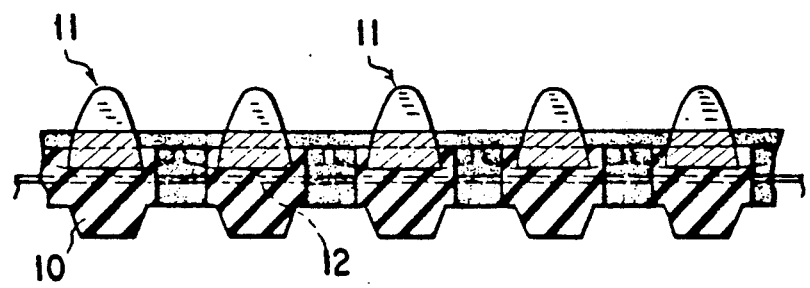
FIGS. 5A and 5B are schematic sectional views of rubber endless track belt assemblies taken along lines VA—VA and VB—VB in FIGS. 4A and 4B, respectively.
Figure 5B:
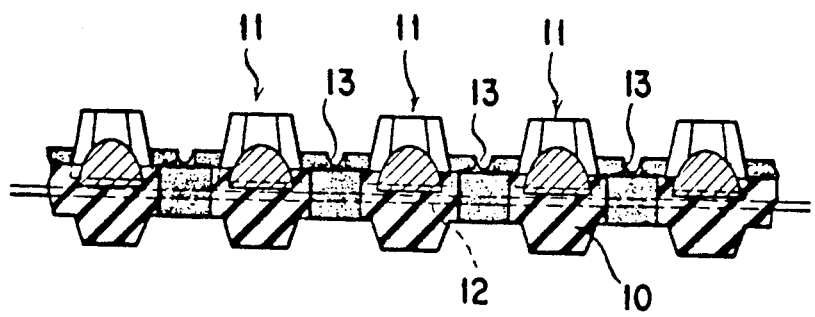

The above-described metal cores 11 are embedded at their respective lower parts in a rubber endless track belt 10, as shown in FIGS. 4A and 4B in which the metal cores shown in FIGS. 6A and 6B are embedded, respectively, at an equal spaced distance to one another as shown in FIGS. 5A and 5B which are taken along lines VA—VA and VB—VB in FIGS. 4A and 4B, respectively.

As is clearly understood from the appearances shown in FIGS. 4A and 4B, in a first embodiment shown in FIG. 4A, each of the flat surface zones 11b, 11b smoothly connected with the upper surfaces of the wing portions 11c, 11c is recessed than the level of the inner peripheral surface of the rubber endless track belt 10 overhung onto the wing portion 11, while in a second embodiment shown in FIG. 4B, each of the stepped flat surface zones 11b, 11b has the same level as the inner peripheral surface of the rubber endless track belt 10.

According to a third embodiment of rubber endless track belt assembly, the rubber endless track belt 10 is formed with a plurality of recessed grooves 13, each being formed therein at a portion positioned between respective shoulder stepped portions of the metal cores 11, 11 adjacent to each other and extending in the transverse direction thereof.

Reference numeral 12 represents a plurality of steel cords embedded inside the metal cores 11 in the rubber endless track belt 10 and extending in the longitudinal direction thereof for reinforcing the belt 10.

Figure 7:
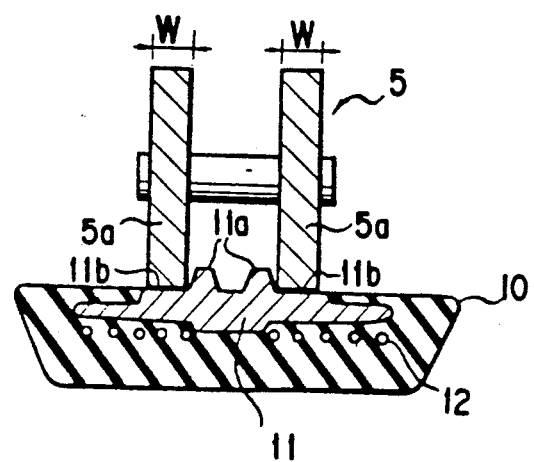
FIGS. 7, 8 and 9 are schematic sectional views showing rubber endless track belt assemblies of the present invention with which outside-contacted bogie wheels (FIG. 7), side-flanged bogie wheels (FIGS. 8 and 9) are associated.
Figure 8:
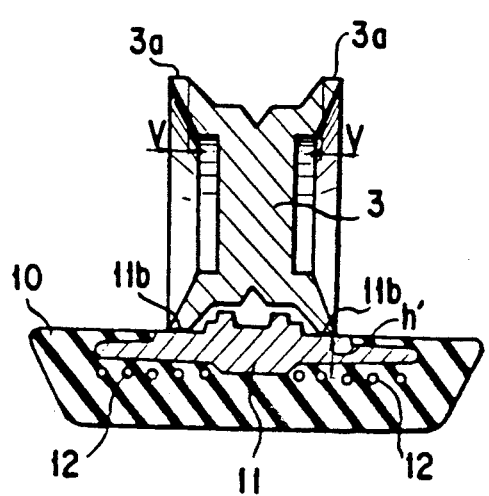
Figure 9:
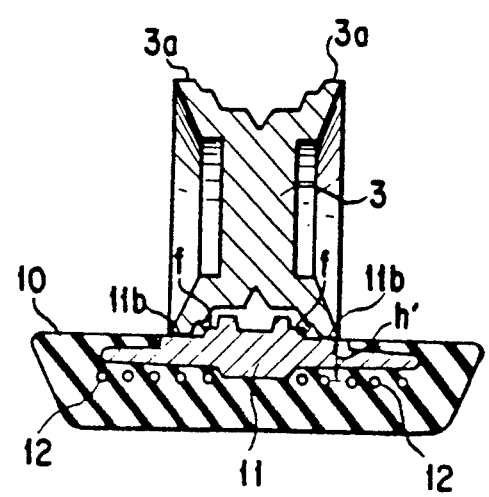

On the use of the rubber endless track belt assemblies having the above-described constructions, they are associated with bogie wheels as shown in FIGS. 7 to 9 in each of which only the rubber endless track belt assembly corresponding to the foregoing second embodiment of the present invention is used as an example, and in which an outside-contacted bogie wheels 5 and side-flanged bogie wheels 3, 3 are associated with the rubber endless track belt assembly in FIG. 7 and F. 8 and 9, respectively.

Figure 1A:
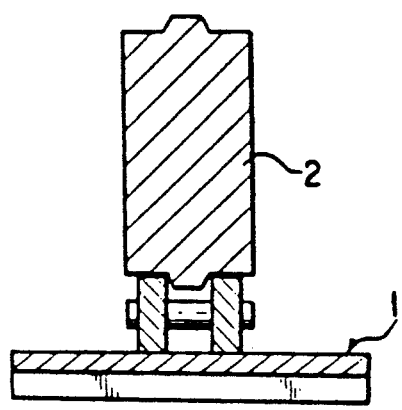
FIGS. 1A and 1B are schematic sectional views showing the prior art metallic endless track belt assemblies with which center-flanged bogie wheels (FIG. 1A) and side-flanged bogie wheels (FIG. 2) are associated, respectively.
Figure 1B:
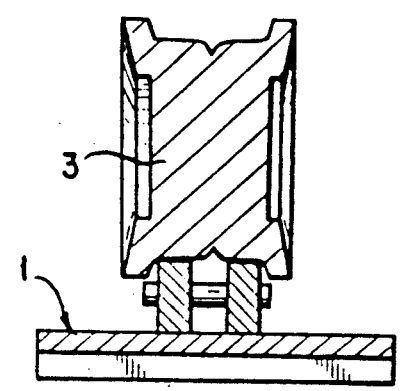
Figure 2A:
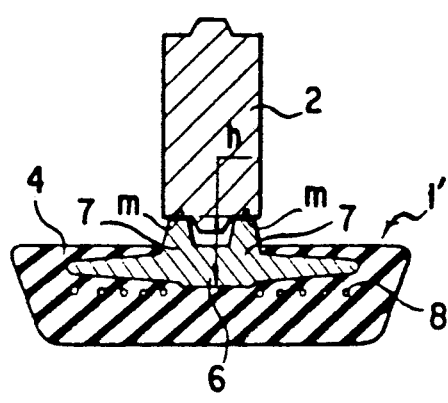
FIGS. 2A and 2B are schematic sectional views showing the prior art rubber endless track belt assemblies with which center-flanged bogie wheels (FIG. 2A) and outside-contacted bogie wheels (FIG. 2B) are associated, respectively.
Figure 2B:
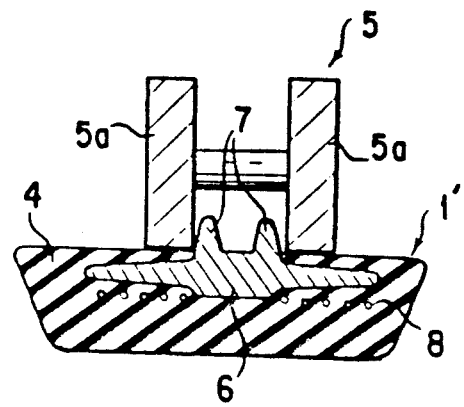
Figure 3:
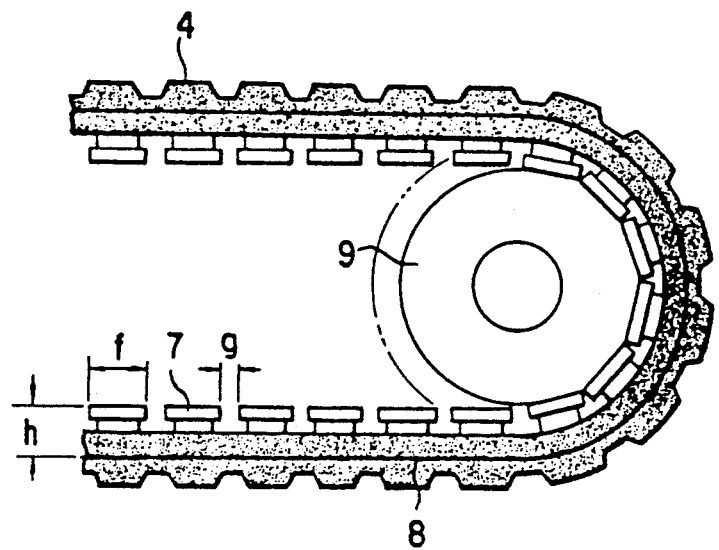
FIG. 3 is a fragmentary schematic sectional view showing the prior art crawler type track mechanism in which the prior art rubber endless track belt assembly is traced around a drive or idler sprocket wheel.

In case the outside-contacted bogie wheels 5 are associated with the endless track belt assembly as shown in FIG. 7, the width "D" of each of flat surface zones 11b, 11b is formed as same as or as being slightly larger than the width "W"0 of each outside flange 5a of the bogie wheels 5. On the other hand, in case of the side-flanged bogie wheels 3 are associated therewith as shown in FIGS. 8 and 9, the width "D" of the flat surface zone 11 is relatively larger than the width "V" of each side flange portion 3a of the bogie wheels 3. In other words, even the side-flanged bogie wheels each having at each side thereof a narrow contacting surface (side flange portion 3a) so as to be exclusively used with the metallic endless track belt assembly 1 in the prior art as shown in FIG. 1B can be favourably associated the rubber endless track belt assembly without any trouble.

In general, the width "D" of the flat surface zone 11b with which the flange portion of each bogie wheel is thrusted contacted in about 0.7 to 4 cm, but it can be optionally designed by taking the size of the metal core 11 into consideration.

Further, the length e of each extended portion of the flat surface zone 11b can be optionally designed also, but ordinarily about 1/5 to 3/5 of the width "S" of the wing portion 11c.

According to the present invention, since the distance h' between the steel cords 12 and the top surface of the flat surface zone 11b, 11b of each metal core 11 can be shortened in case the side-flanged bogie wheels 3 or the outside-contacted bogie wheels 5 are associated with the rubber endless track belt assembly, and moreover the distance e' between the adjacent metal cores 11, 11 can be narrowed without causing the "collision phenomenon" therebetween as shown in FIG. 10 in which the rubber endless track belt assembly of the present invention is traced around a drive or idler sprocket wheel, the "inward bending phenomenon" of the rubber endless track belt 10 can be prevented so as to protect the fall-in of the bogie wheel 3 or 5 into a recessed portion formed between the adjacent metal cores 11, 11 and to reduce fluctuation vibrations of the belt assembly thereby effecting a stable running condition in construction vehicles, and, further, the winding pressure rate between the rubber endless track belt assembly and the drive or the idler sprocket wheel 14 can be reduced so as to perform an effective transmission of driving force from the drive sprocket wheel to the rubber endless track belt assembly At that time, such an operational function as relieving compressive strain generated in the rubber endless track belt and concentrated at the inner peripheral surface of the belt is obtained by the provision of the recessed grooves 13.

Further, since the bogie wheels 3 or 5 are allowed to thrustedly contact the rubber endless track belt assembly through the pairs of flat surface zones 11b, 11b, the rubber endless track belt 10 can be prevented from causing the "pitting phenomenon" on the surface thereof, thereby enhancing the durability of the rubber endless track belt assembly.

Still further, since the side-flanged bogie wheels 3 and the outside-contacted bogie wheels 5 can be associated with the rubber endless track belt assembly, it is unnecessary to provide each of the bogie wheels with a come-off protection board (not shown) for protecting the disengage of the belt from the bogie wheels 2, 3 or 5.

What is claimed is:

1. A rubber endless track belt assembly for use with a drive sprocket wheel assembly and an idler sprocket wheel assembly, said rubber endless track belt assembly comprising:
   a rubber endless track belt;
   a plurality of metal cores imbeddded to an equal distance to each other in said rubber endless track belt along the longitudinal direction of said rubber endless track belt;
   each of said metal cores having a single portion extending and exposed from said rubber endless belt, said single portion comprising a guide lug at the center of said portion, a pair of wing portions extending perpendicular to the longitudinal direction of said rubber endless track belt on opposite sides said guide lug, and a pair of flat surface zones between said guide lug and said pair of wing portions;
   wherein each of said pair of flat surface zones has extended portions, which extend perpendicularly beyond the wing portion along the longitudinal direction of said rubber endless track belt, and has a predetermined width adapted to receive thereon a bogie wheel of said rubber endless track belt assembly.

2. A rubber endless track belt assembly as set forth in claim 1 wherein each of the pair of flat surface zones is formed on a shoulder stepped portion of the guide lug so as to rise over the wing portion.

3. A rubber endless track belt assembly as set forth in claim 1, wherein each of the pair of flat surface zones is formed smoothly from the surface of said wing portion on the inner peripheral side of the rubber endless track belt so that the inner peripheral surface of said belt extends onto the wing portion of each metal core.

4. A rubber endless track belt assembly as set forth in claim 2, wherein the surface of said flat surface zone is exposed and has the same level as the inner peripheral surface of the rubber endless track belt.

5. A rubber endless track belt assembly as set forth in claim 1, further comprising a plurality of steel cords embedded in the rubber endless track belt inside the metal cores and extending in the longitudinal direction of said belt.

6. A rubber endless track belt assembly as set forth in claim 1, said rubber endless track belt is formed with a plurality of recessed grooves, each being formed therein at a portion positioned between respective shoulder stepped portions of the metal cores adjacent to each other and extending in the transverse direction of said belt.

7. A rubber endless track belt assembly as set forth in claim 1, wherein the extended portion at each of each flat surface zone extends for a predetermined length beyond the wing portion, said predetermined length of each extended portion being approximately one-fifth to three-fifths the width of the wing portion adjacent said flat surface zone.

8. A rubber endless track belt assembly as set forth in claim 1, further comprising a bogie wheel, wherein the predetermined width of each flat surface zone is substantially equal to the width of the bogie wheel.

9. A rubber endless track belt assembly as set forth in claim 5, wherein the plurality of steel cords are embedded underneath said wing portions and said flat surface zones of the metal cores.

* * * * *